(12) United States Patent
Coiro, Sr. et al.

(10) Patent No.: US 6,394,032 B1
(45) Date of Patent: May 28, 2002

(54) DEVICE FOR SIMULATING STATIC LOAD OF A CONNECTION TO A RACK FOR ANIMAL CAGES

(75) Inventors: Michael A. Coiro, Sr., Jacobstown; Frank J. Herdt, Bordentown; Brian M. Bilecki, Trenton, all of NJ (US)

(73) Assignee: Allentown Caging Equipment Co., Inc., Allentown, NJ (US)

(*) Notice: Subject to any disclaimer, the term of this patent is extended or adjusted under 35 U.S.C. 154(b) by 0 days.

(21) Appl. No.: 09/519,386

(22) Filed: Mar. 3, 2000

(51) Int. Cl.[7] .............. A01K 1/00; F24F 7/07; F24F 7/08; F17D 1/20; F17D 3/00
(52) U.S. Cl. .............. 119/448; 119/455; 454/237; 137/798; 137/596; 285/70; 285/119; 403/25; 403/34
(58) Field of Search .............. 119/448, 455; 454/237; 403/24, 25, 34; 137/99, 561 A, 625.2, 596, 798; 285/9.2, 119, 383, 328, 169, 70

(56) References Cited

U.S. PATENT DOCUMENTS

| | | | |
|---|---|---|---|
| 1,594,673 A | * 8/1926 | Kreutzer et al. | 119/448 X |
| 5,145,460 A | * 9/1992 | Smith, Jr. | 119/448 X |
| 5,307,757 A | 5/1994 | Coiro, Sr. et al. | 119/17 |
| 5,707,283 A | * 1/1998 | Oberreuter et al. | 119/448 X |
| 5,771,265 A | * 6/1998 | Montazer | 376/272 |
| 6,029,698 A | * 2/2000 | Murray et al. | 137/601.01 |

FOREIGN PATENT DOCUMENTS

| | | | | |
|---|---|---|---|---|
| EP | 238722 A2 | * | 9/1987 | 119/448 |
| JP | 5-184255 | * | 7/1993 | 119/448 |
| JP | 5-219855 | * | 8/1993 | 119/448 |

\* cited by examiner

*Primary Examiner*—Thomas P. Noland
(74) *Attorney, Agent, or Firm*—Mathews, Collins, Shepherd & McKay, P.A.

(57) ABSTRACT

The present invention relates to a device for simulating static load of a connection to a ventilated rack of animal cages when at least one of the racks are not connected to a central ventilation system. Accordingly, the device assures that the ventilation system is balanced when one or more of the ventilated racks are removed from their respective air supply or exhaust drops of the central ventilation system. The device includes a pair of spring biased legs which automatically close when a rack is removed from the central air system. The legs have an outwardly curved shape at one end forming an opening between the first and second leg. In the closed position, ends of the legs are adjacent to one another such that the distance between the legs is reduced, thereby creating a partial obstruction to air flow in the connection which is identical to the static load created by the ventilated rack.

12 Claims, 5 Drawing Sheets

DEVICE FOR SIMULATING STATIC LOAD OF A CONNECTION TO A RACK FOR ANIMAL CAGES

BACKGROUND OF THE INVENTION

1. Field of the Invention

The present invention relates to a device for simulating static load of a connection to at least one rack for animal cages when one or more of the racks are not connected to their respective supply or exhaust drops of a central ventilation system.

2. Related Art

Systems for providing air and removing exhaust from racks containing animal cages are known. U.S. Pat. No. 5,307,757 describes an animal cage rack including a forced air system in which positive air is supplied by an air inlet manifold. Air is removed from the cage by negative air pressure to an exhaust manifold. The exhausted air is treated with a laboratory air treatment system or portable HEPA filtered exhaust unit and is released.

Alternatively, air supply and exhaust for a rack of animal cages is supplied by a central ventilation system. Several racks can be connected to the ventilation system. The ventilation system includes an air supply drop and air exhaust drop. One end of the drop is connected to a respective duct of the ventilation system for either supplying air or removing exhaust. The other end of the drop is connected to a respective air supply plenum and air exhaust plenum of the rack of animal cages. This system has the disadvantage that when racks are removed from the drops the unattended exhaust drop or supply drop becomes the path of least resistance and a greater amount of air than originally intended follows this path, thereby bypassing the remaining racks.

Conventional control valves are used to control laboratory air flow of fame hoods having general exhaust and room supply air. The valves regulate air flow as duct static pressure varies. A pressure independent controller within the control valve adjusts to static pressure. For example, the controller can include a cone biased in a venturi to maintain a set flow. An example of this type of control valve is manufactured as an Accell®II Airflow Control Valve, by Phoenix Controls Corporation, Massachusetts. This type valve has the shortcoming of using a complicated mechanical system, which is expensive to manufacture and can be subject to mechanical failures.

It is desirable to provide a device for simulating static load of a connection to a rack of animal cages when one or more racks are not connected to the supply and exhaust of a central ventilation system in order to control air flow between the central ventilation system, thereby allowing the rack to be expeditiously removed from the ventilation system without impeding operation of the ventilation system.

SUMMARY OF THE INVENTION

The present invention relates to a device for simulating static load of a connection to a ventilated rack of animal cages when at least one of the racks are not connected to a central ventilation system. Accordingly, the device assures that the ventilation system is it, balanced when one or more of the ventilated racks are removed from their respective air supply or exhaust drops of the central ventilation system. The device includes a pair of spring biased legs which automatically close when a rack is removed from the central air system. The legs have an outwardly curved shape at one end forming an opening between the first and second leg. In the closed position, ends of the legs are adjacent to one another such that the distance between the legs is reduced, thereby creating a partial obstruction to air flow in the connection which is identical to the static load created by the ventilated rack. Preferably, a stop prevents the spring biased legs from overlapping in the closed position.

The spring biased legs include a handle at the other end. The legs can be opened by pressing the handle of each leg toward one another in order to increase the distance between the legs. In the open position, a plenum connection of a rack of animal cages can be inserted between the legs for connecting to a drop of the ventilation system. Accordingly, the plenum connection provides air supply and air exhaust to the rack of animal cages from a respective air supply drop or exhaust drop of the ventilation system.

A base ring is attached to the spring biased legs. An inner ring is attached to the base ring. The inner ring slides into the air supply or exhaust drops of the ventilation system. A band clamp ring couples the drops of the ventilation system to the base ring. Accordingly, the device is affixed to the air supply and exhaust drops of the central ventilation system and the device automatically simulates the static load when plenum connections to a rack of animal cages are removed from the central ventilation system.

The device can be color coded with a different color representing air supply and exhaust. The color coded device is attached to the respective duct of the ventilation system to aid identification of the air supply drop and exhaust drop. Accordingly, the device promotes expeditious connection of the respective air supply and exhaust plenums of the rack to a respective air supply drop and exhaust drop of the ventilation system.

The invention will be more fully described by reference to the following drawings.

DETAILED DESCRIPTION

Figure 1B:
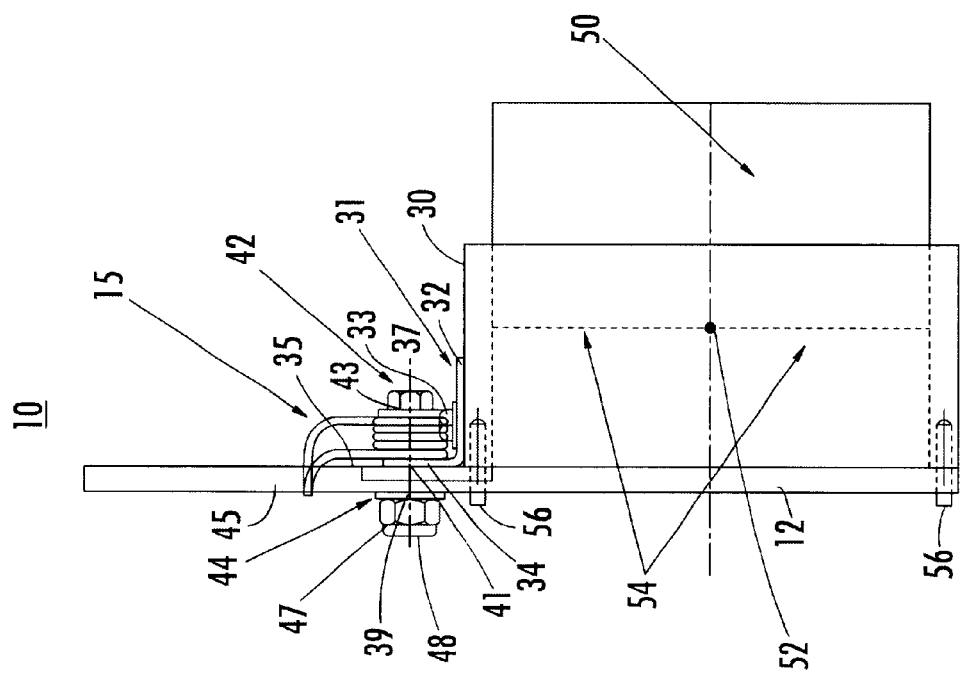
FIG. 1B is a side elevational and sectional view of the device.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1A:
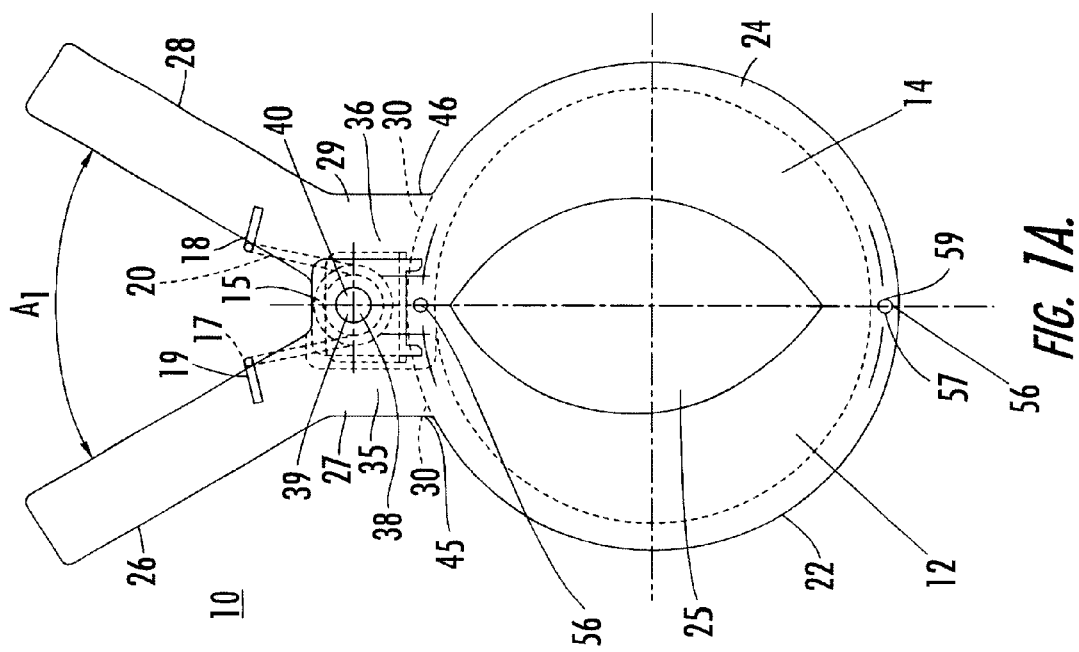
FIG. 1A is a top sectional view of a device for simulating static load in accordance with the teachings of the present invention.

FIGS. 1A–1B illustrate a device for simulating static load 10 in accordance with the teachings of the present invention.

Leg 12 and leg 14 are biased by spring 15. Spring leg 17 of spring 15 is coupled to leg 12. Spring leg 18 of spring 15 is coupled to leg 14. For example, spring leg 17 can be received in aperture 19 of leg 12 and spring leg 17 can be received in aperture 20 of leg 14, thereby coupling spring 15 respectively to leg 12 and leg 14.

Outer portion 22 of leg 12 and outer portion 24 of leg 14 have an outwardly curved shape for forming opening 25 between leg 12 and 14. Handle 26 extends angularly from middle portion 27 of leg 12. Handle 28 extends angularly from middle portion 29 of leg 14. For example, handle 26 and handle 28 can have an angled shape to provide an angle A1 between handle 26 and handle 28 of about 60°. Handle 26 is formed integrally with leg 12. Handle 28 is formed integrally with leg 14.

Base ring 30 is coupled to leg 12 and leg 14 with screws 29. Spring bracket 31 couples spring 15, leg 12, leg 14 and base ring 30. End 32 of spring bracket 31 attaches to base ring 30 with screw 33. End 34 of spring bracket 31 attaches to surface 35 of leg 12 and surface 36 of leg 14. Screw 37 is received in opening 38 of spring 15, opening 39 of leg 12, opening 40 of leg 14 and aperture 41 of spring bracket 31. Nut 42 attaches to end 43 of screw 37. For example, nut 42 can be a hex nut. Washer 44 is placed between surface 45 of leg 12, surface 46 of leg 14 and nut 47. Nut 47 attaches to end 48 of screw 37.

Base ring 30 is coupled to inner ring 50. For example, screws 52 can be used to attach base ring 30 to inner ring 50. Weld 54 can be formed between the outer diameter of base ring 30 and the inner diameter of inner ring 50 to prevent air from escaping between the inner diameter of base ring 30 and inner ring 50. For example, base ring 30 can be an aluminum pipe having a four-inch outer diameter and inner ring 50 can be an aluminum tube having a four-inch inner diameter. Pins 56 extend from base ring 30.

Figure 2:
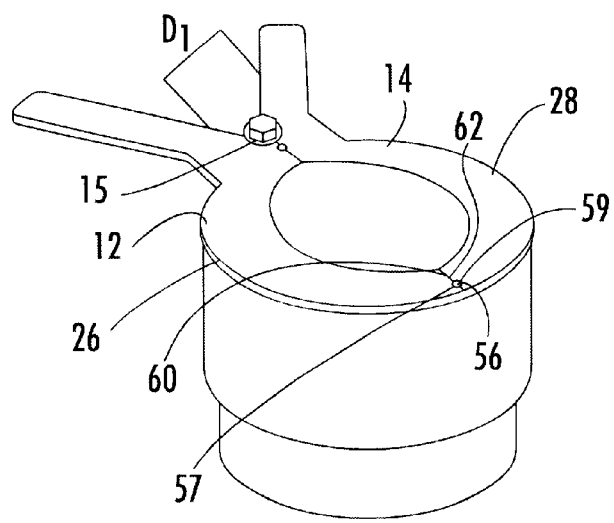
FIG. 2 is a perspective view of the device in a closed position.

In the closed position of device 10 shown in FIG. 2, pins 56 rest against indentation 57 of leg 12 and indentation 59 of leg 14 to provide a stop for leg 12 and leg 14. Spring 15 biases end 60 of leg 12 against end 62 of leg 14. Opening 26 has a distance $D_1$ between leg 12 and leg 14. Distance $D_1$ of opening 26 is determined to obstruct air flow and provide a predetermined simulated static load when device 10 is connected to a central ventilation system. Distance $D_1$ can be calculated from empirical data by conventional methods.

Figure 3:
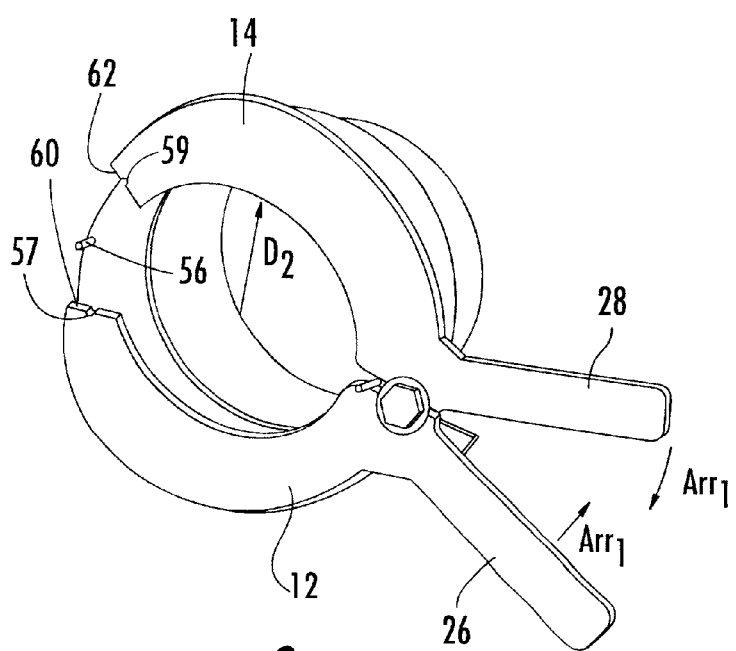
FIG. 3 is a perspective view of the device in an open position.
Figure 4:
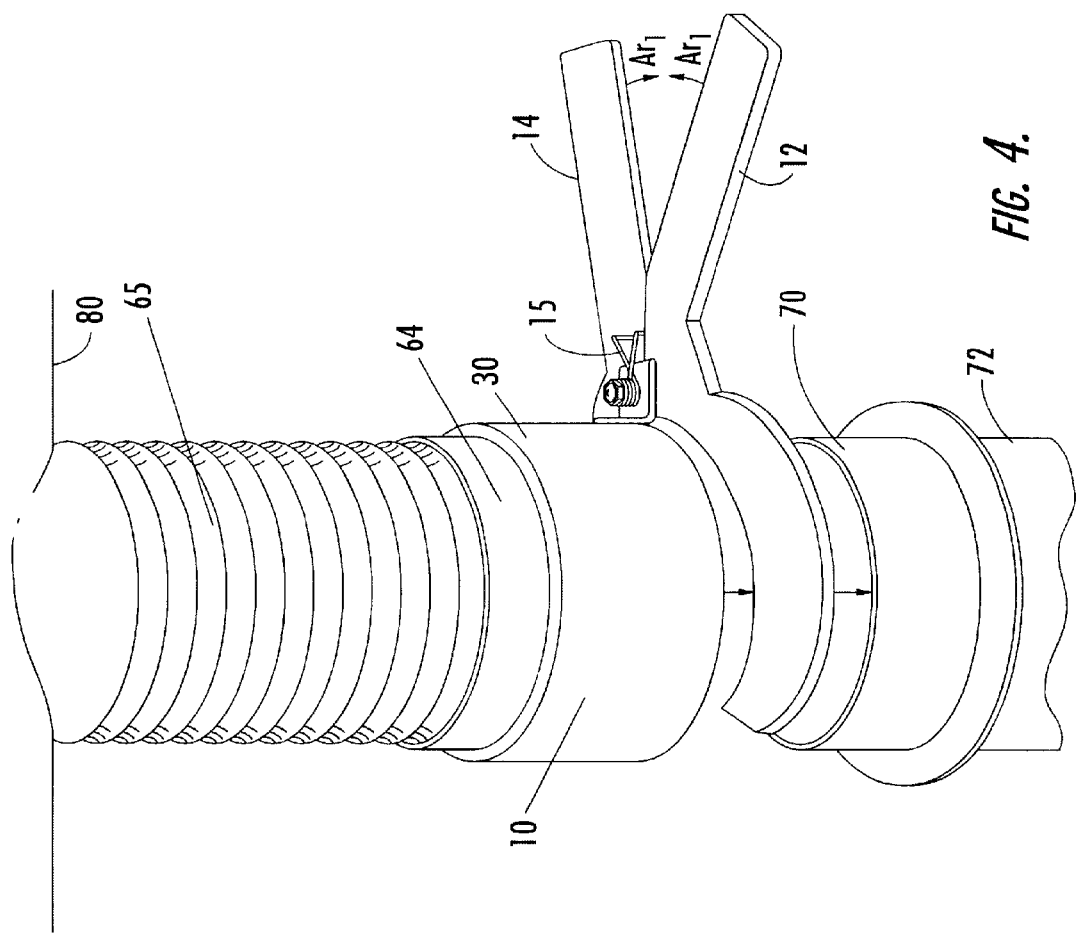
FIG. 4 is a perspective view of the device connected to a drop of a central ventilation system during connection to a plenum of a rack of animal cages.

In the open position of device 10 shown in FIG. 3, handle 26 is moved toward handle 28 in the direction of arrow $A_{rr1}$ to increase distance $D_1$ of opening 26 to a distance $D_2$. Distance $D_2$ is large enough to allow plenum ring 70 of ventilated rack of animal cages 72 to be received in opening 26, as shown in FIG. 4.

Band clamp ring 64 couples drop 65 of ventilation system 80 to device 10 after inner ring 50 is received within drop 65. For example, drop 65 can be a flexible plastic hose. Preferably, band clamp ring 64 permanently attaches device 10 to drop 65 when device 10 is in the open and closed positions.

Figure 5:
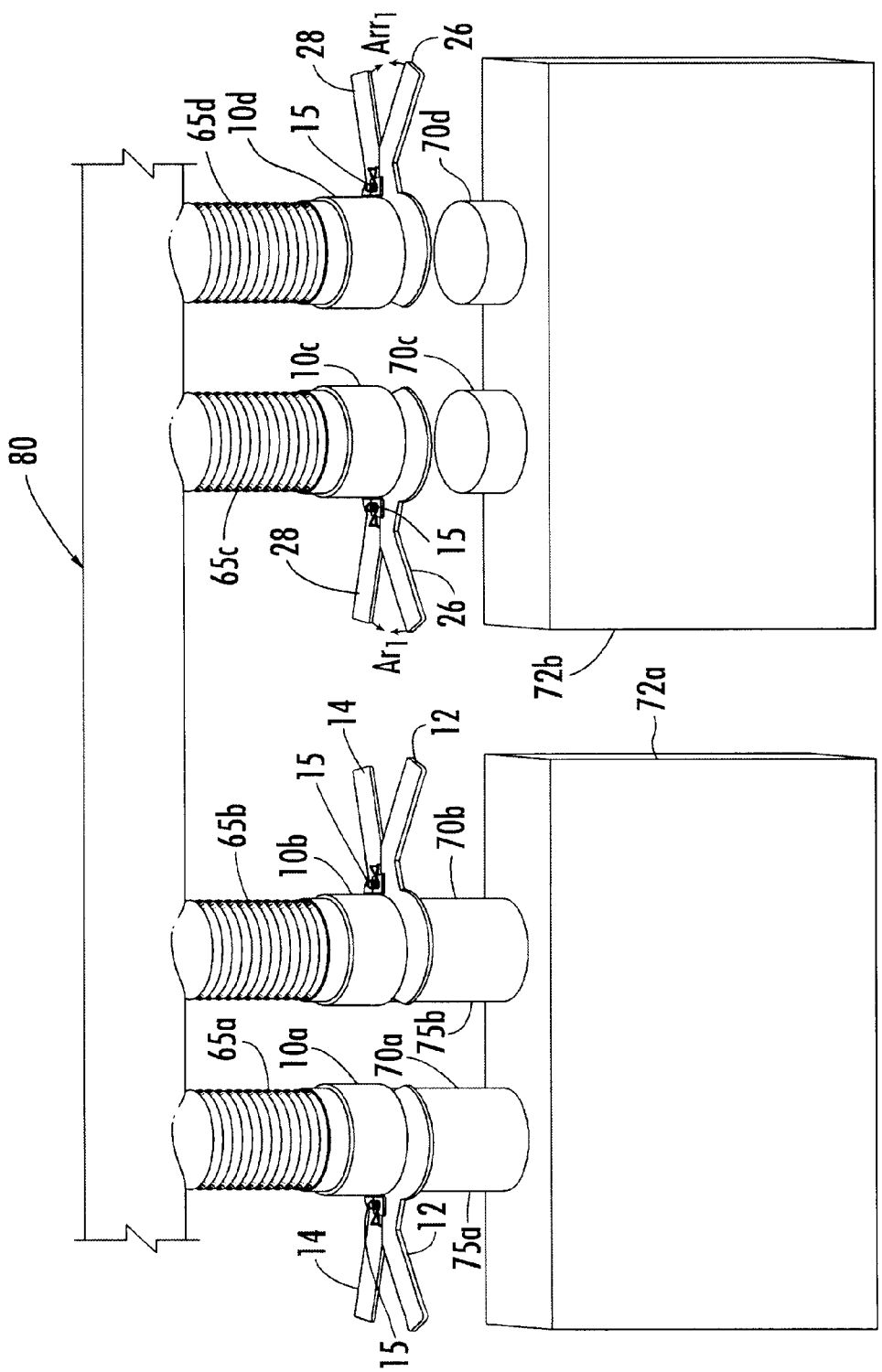
FIG. 5 is a schematic diagram of connection and removal of racks of animal cages to the central ventilation system using devices of the present invention.

Band clamp ring 64 can be removed to remove device 10 from drop 65. A plurality of devices 10a–10d can be connected to a plurality of drops 65a–d of a central ventilation system 80 & 81, as shown in FIG. 5. Each of devices 10a–10b is attached to a respective drop 65a–65d. During connection of ventilated rack of animal cages 72a to central ventilation system 80, device 10a and device 10b are placed in the open position to receive plenum ring 70a and plenum ring 70b, respectively. Plenum ring 70a connects to an air supply of ventilated rack 72a and plenum ring 70b connects to an exhaust ventilated rack 72a. Spring 15 biases leg 12 and leg 14 to outer surface 75a of plenum 70a and outer surface 75b of plenum 70b. During disconnection of ventilated rack of animal cages 72b, handle 26 and handle 28 of device 10c and device 10d are moved toward one another in the direction of arrow $A_{rr1}$ to release respective plenum ring 70c and plenum ring 70d. After releasing plenum ring 70c and ring 70d, spring 15 automatically biases leg 12 and leg 14 into the closed position. Ventilated rack of animal cages 72a and 72b can be conventional ventilated rack of animal cages system such as ventilated rack animal cage systems manufactured by Allentown Caging Equipment Co., Allentown, N.J. as Model No. MS7115R140MVP.

Devices 10a–10d can be color coded to assure correct connections to drops 65a–65d. For example, devices 10a and 10c can be coded blue for connecting to air supply of ventilation system 80 and devices 10b and 10d can be coded red for connecting to air exhaust of ventilation system 80. Accordingly, plenum ring 70a of animal cage rack system 72a representing air supply is connected to device 10a which is coded blue and plenum ring 70b of animal cage rack system 72a representing air exhaust is connected to device 10b which is coded red.

Figure 6:
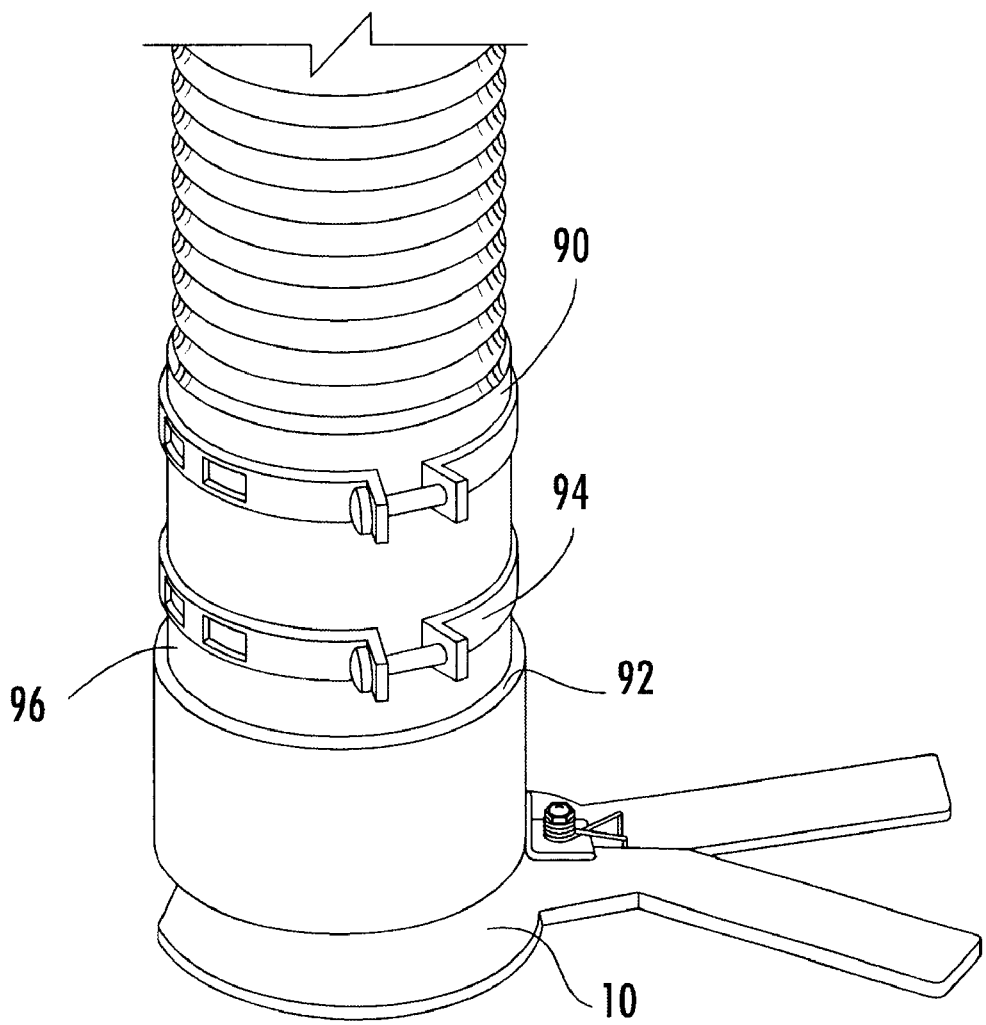
FIG. 6 is a perspective view of an alternative embodiment for connection of the drop to the device.

FIG. 6 illustrates an alternative coupling of drop 65 to device 10. Boot 90 is received over end 92 of drop 65. Fastener 94 couples boot 90 to outside surface 96 of base ring of device 10. For example, fastener 94 can be an adjustable band clamp for accommodating larger or smaller tube sizes.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

We claim:

1. A device for simulating static load of a connection to a ventilated rack of animal cages from a ventilation system when the rack is removed from the ventilated system, said device comprising:

a first leg and a second leg, said first leg and said second leg having an outwardly curved shape for forming an opening between said first leg and said second leg; said first leg and said second leg having a first end;

spring means for biasing said first leg and said second leg; and a base ring coupled to said spring means, said base ring adapted to connect to an air supply connection or an exhaust connection of said ventilation system, wherein said first leg and said second leg are movable between an open position in which said first end of said first leg and said second leg are moved away from one another and a closed position in which said first end of said first leg and said second leg are adjacent to one another, said open position adapted to receive a connection to a ventilated rack of animal cages and said closed position simulating a static load of said ventilated rack of animal cages when said connection to said ventilated rack is removed.

2. The device of claim 1 wherein a second end of said first leg is a first handle and a second end of said second leg is a second handle, wherein said first handle and said second handle are moved toward one another for moving said device to said open position.

3. The device of claim 1 wherein said spring means automatically moves said device into said closed position when said device is removed from said ventilated rack.

4. The device of claim 1 further comprising:

a spring bracket attached to said base ring, said spring, said first leg and said second leg.

5. The device of claim 4 wherein a screw is inserted through an aperture in said spring bracket, an opening in said spring, an opening in said first leg, an opening in said second leg and is retained with a nut attached to an end thereof.

6. The device of claim 1 further comprising:

an inner ring attached to said base ring, wherein said inner ring is adapted to be received in said air supply connection or exhaust connection of said ventilation system.

7. The device of claim 1 further comprising:

a band clamp ring, said band clamp ring attaching said device to said air supply connection or exhaust connection.

8. The device of claim 1 wherein a distance $D_1$ between said first leg and said second leg in the open position is smaller than a distance $D_2$ between said first leg and said second leg in the closed position.

9. The device of claim 1 further comprising:

a stop extending from said base ring and said first leg and said second leg having an indentation, wherein in the closed position said stop is adjacent said indentation of said first leg and said indentation of said second leg.

10. The device of claim 1 wherein in said open position said device is adapted to connect to the ventilated rack and in said closed position said ventilated rack is removed from said device.

11. The device of claim 1 wherein said device is color coded with a first color representing a connection to the air supply connection and a second color representing a connection to the exhaust connection of said ventilation system.

12. The device of claim 1 further comprising:

a boot received of an end or said air supply connection or exhaust connection of said ventilation system, said fastener adapted to be received over the outside of an inner ring attached to said base ring for connecting said device to said air supply connection or exhaust connection.

* * * * *